April 23, 1940.  D. McDONALD  2,198,413
SOLVENT EXTRACTION OF OIL FROM OLEAGINOUS MATERIAL
Filed Feb. 8, 1937
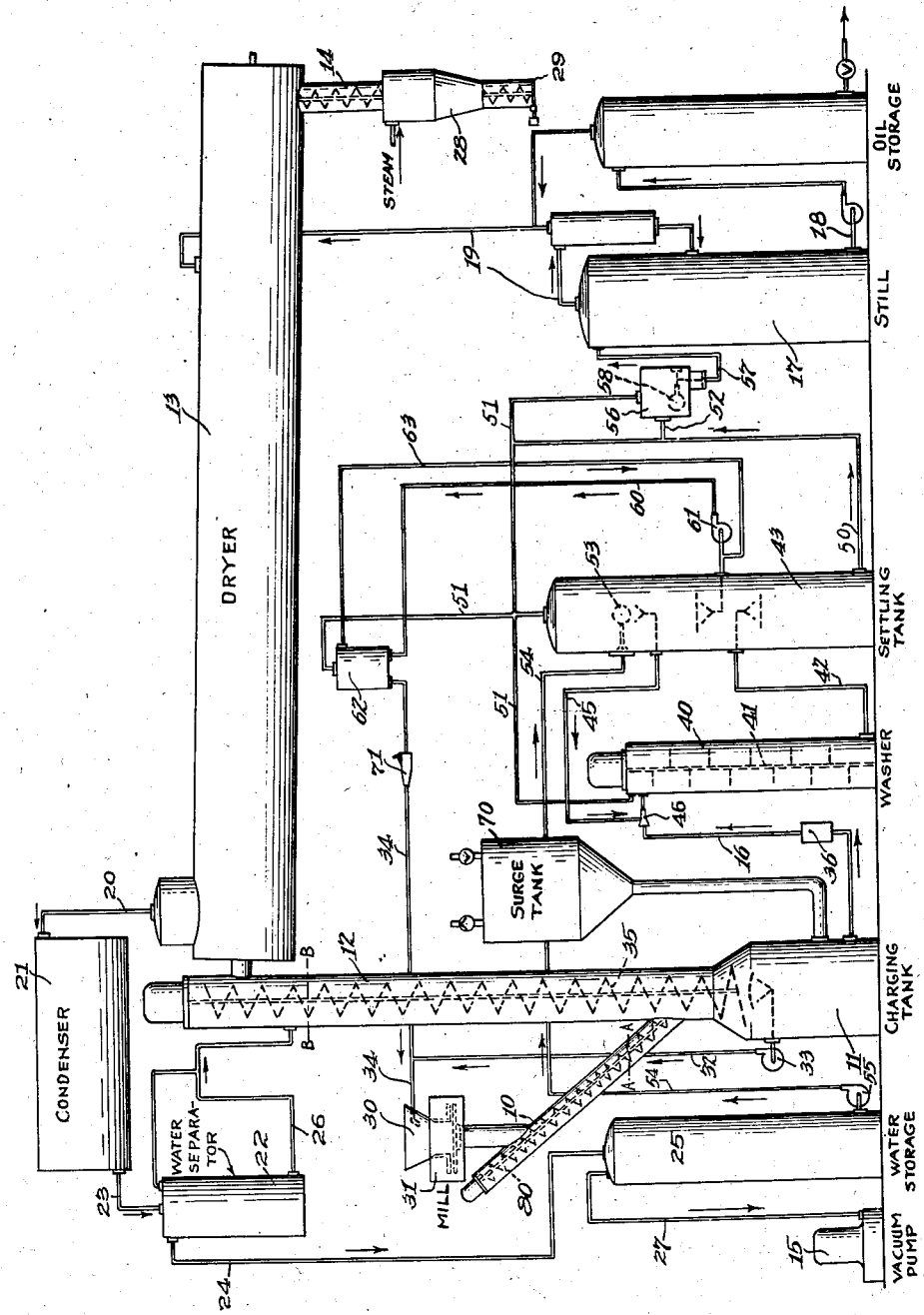
Inventor:
Dan McDonald Patented Apr. 23, 1940

2,198,413

UNITED STATES PATENT OFFICE 2,198,413

SOLVENT EXTRACTION OF OIL FROM OLEAGINOUS MATERIAL

Dan McDonald, Los Angeles, Calif., assignor to Engineering Incorporated, Los Angeles, Calif., a corporation of California Application February 8, 1937, Serial No. 124,596

15 Claims. (Cl. 260—412.8)

This invention relates to solvent extraction of oil from oleaginous material, and has for its object to create an appreciable specific gravity differential between residual material and the oil-bearing solvent in order that they may readily separate.

The invention is particularly applicable to solvent extraction of oil from seed and the like, the seed, preferably ground to fine meal, being treated with solvent for dissolving its oil content, and the oil bearing solvent being then separated from the meal for subsequent drying and recovery of the meal and for separate recovery of the oil. It is the object of the invention to expedite and insure thorough separation of the meal from the oil bearing solvent by creating a specific gravity differential, in order that the oil, clear of meal, may be readily and economically recovered.

More particularly it is an object of the invention to change the specific gravity of material which is treated in a liquid, by causing it to absorb a second liquid, immiscible with the first liquid, and which results in an impregnated material having a specific gravity substantially different from that of the first liquid. As applied to solvent extraction of oil, where solvents of appreciably different specific gravity from that of water are generally employed, the specific gravity of the meal may be changed by causing it to absorb aqueous moisture so that its specific gravity approaches that of water, and consequently is of such appreciable difference from that of the specific gravity of the solvent as to readily separate therefrom.

It is a further object of the invention to increase the specific gravity differential between a material and a liquid in which it is treated, by impregnating the material with a second liquid, immiscible in the first liquid and having an unbalanced ion concentration so that absorption of the second liquid by the material is appreciably increased. In solvent extraction of oil from meal, this increased absorption with consequent appreciable change in the specific gravity of the meal, may be obtained by causing the meal to absorb an aqeuous salt solution.

It is a still further object of the invention to insure economical operation by retaining the material and its impregnating liquid in the system after specific gravity differential has separated the material from the liquid in which it is treated, for recovery and reuse of any solvent which may be present with the impregnating liquid, and for drawing off and drying the material and separately recovering the same.

When extracting oil from meal by means of a solvent, a closed system may be employed, the meal which has absorbed aqueous moisture being treated with a solvent and then separating from the oil bearing solvent as a result of specific gravity differential, with the oil bearing solvent then drawn off into an aqueous bath to insure complete absorption of moisture by the fine particles of meal which may remain in suspension in the oil bearing solvent. The resulting appreciable specific gravity differential between the suspended meal and the oil bearing solvent insures their ready separation when the flow is subsequently maintained in a quiescent state, with the separated meal and any excess of aqueous moisture then retained in the closed system for subsequent recovering of any solvent which remains with the excess water, and with the oil bearing solvent, clear of meal, drawn off and retained in the closed system for recovery of the oil and subsequent reuse of the solvent.

For this purpose the separated meal and any excess of aqueous moisture, may be returned to the incoming meal which is initially supplied to the system, whereby said excess moisture supplies the moisture which is to be absorbed by the incoming meal, and said returned meal and excess moisture becomes a part of the main body of meal which initially separates from the oil bearing solvent. This main body of meal which initially separated from the oil bearing solvent, is then drawn off to a dryer which is a part of the closed system, where all remaining solvent and aqueous moisture which is still present with the meal, is vaporized. These vapors are then condensed, and the condensate is then separated into its solvent and water constituents, which are retained in the closed system for reuse of the water in the aforementioned aqueous bath and for reuse of the solvent for extracting oil from an additional quantity of incoming meal.

Further objects of the invention will be readily understood from the following description, reference being made to the accompanying diagrammatic drawing in which I have shown a preferred apparatus adapted for use in extracting oil from meal by means of a solvent.

The invention is applicable to treatment of various materials by various liquids, and provides for separating the liquid from the treated material; but is particularly adapted and as a preferred embodiment is shown and described as used in solvent extraction of oil from meal.

The apparatus which is employed may be of the general type disclosed in my copending application Ser. No. 12,434, filed March 22, 1935, the meal being supplied via conduit 10 to a charging tank 11 in which solvent is maintained, and the meal after treatment by the solvent being withdrawn via a conduit 12 which extends upwardly from the charging tank, and discharging into a drier 13 from whence the dry meal is withdrawn via a discharge conduit 14.

The solvent which has extracted oil from the meal, separates from the meal as a result of specific gravity differential, and in the illustrated apparatus which is adapted for use of a solvent which is heavier than the meal, e. g., trichlorethylene, the oil bearing solvent settles below the meal and is withdrawn via a conduit 16 which communicates with the lower end of the charging tank 11. The oil bearing solvent is subsequently treated for separate recovery of the oil and the solvent, preferably in a still 17, the oil being drawn off via conduit 18 and the solvent vapors of distillation being withdrawn via conduit 19 for subsequent condensation and recovery and reuse of the solvent.

The treated meal which is withdrawn via the conduit 12 is heated in the dryer 13 for vaporizing the solvent and aqueous moisture which may be carried over into the dryer along with the meal, and these vapors are withdrawn via a conduit 20 to a condenser 21. The vapors of distillation which are withdrawn from the still 17 via the conduit 19 may be handled in the same condenser, and the conduit 19 may lead to the dryer 13 so that the vapors of distillation from the still supply latent heat of vaporization for the remaining traces of solvent which are evaporated from the meal in the dryer, with all of the vapors from the dryer then conducted to the condenser via the conduit 20.

From the condenser the condensate preferably flows to a water separator 22 via a conduit 23, from whence the water may flow via conduit 24 to a water storage tank 25. Solvent is withdrawn from the water separator via conduit 26 for reuse in the system, preferably by connecting the conduit 26 with the upright conduit 12 for supplying a counterflow of solvent in said upright conduit. This counterflow extracts the last traces of oil from the meal as the buoyancy of the meal causes it to rise through the counterflow of solvent.

The system is preferably a closed system maintained under partial vacuum by a vacuum pump 15 which may be connected to a conduit 27 leading from the upper end of the water storage tank 25. The intake end of the closed system is sealed by the column of solvent which the partial vacuum maintains in the conduit 12, and the discharge end of the system is provided with a seal 28 which is connected to the discharge conduit 14, and which may be of the type described in my aforementioned copending application. This seal maintains a compact mass of the dried meal above the discharge gate 29 of the seal, with this mass of dried material sealing the discharge conduit 14 while the meal is discharging via said gate.

The meal which is supplied to the conduit 10 may be any oil bearing seed or the like, preferably ground to a comparatively fine meal to insure efficient extraction of oil when it is treated with the solvent. To increase the efficiency of the oil extraction, the seed or the like may be ground in the presence of the solvent as set forth in my copending application Ser. No. 112,746, filed November 25, 1936. For this purpose the material, such as seed or the like, may be supplied via a hopper 30 to an attrition mill 31 from whence the ground product is supplied to the conduit 10, and solvent which is employed for extracting oil from the meal, is supplied to the material while it is being ground in the mill, preferably via a conduit 32 which leads from the body of solvent which is maintained in the charging tank 11. Solvent may be pumped through this conduit by a suitable pump 33.

The present invention provides an appreciable specific gravity differential between the ground meal and the solvent, so that when the solvent has extracted the oil from the meal, the oil bearing solvent and the meal may be readily separately recovered with the oil bearing solvent clear of meal. For this purpose the meal is caused to absorb moisture so as to increase the specific gravity differential between it and the solvent. When the solvent which is employed is heavy, e. g., trichlorethylene, the moisture which is absorbed by the meal may be aqueous moisture, so that the specific gravity of the impregnated meal approaches that of water and is consequently appreciably less than that of the relatively heavy solvent. The aqueous moisture is supplied to the meal at any time during its treatment, prior to separation of the oil bearing solvent from the treated meal, and consequently may be supplied to the meal after it reaches the charging tank 11 or at any time prior thereto. In practice the aqueous moisture may be supplied to the mill 31, via a conduit 34 which may connect with the solvent supplying conduit 32 whereby the aqueous moisture is present with the meal throughout its treatment by the solvent which is supplied via the conduits 26 and 32.

The meal which has absorbed the aqueous moisture which has been supplied via the conduit 34, is discharged via the conduit 10 into the lower end of the conduit 12. The solvent which is supplied to the charging tank 11 is maintained at a level A—A in the conduit 10, and responsive to the partial vacuum in the system rises to a higher level B—B in the conduit 12. A surge tank 70 preferably communicates with the tank 11 to accommodate the column of solvent which recedes from the conduit 12 when the partial vacuum in the system is destroyed by shutting down the plant.

The hydrated material which is supplied via the conduit 10 thus passes through a body of the solvent, and is preferably moved along the conduit 10 by a spiral conveyor 80. Responsive to specific gravity differential the hydrated meal then rises through the column of solvent in the conduit 12 where it is subjected to the counterflow of solvent which is supplied via the conduit 26, and as it rises through the column of solvent the meal is preferably agitated by a spiral agitator 35 which may also assist in elevating the meal. All of the hydrated meal is thus subjected to the solvent for extracting the oil of the meal, and the oil bearing solvent, being appreciably heavier than the hydrated meal, settles to the bottom of the charging tank 11 for efficient separation from the buoyant meal.

The oil bearing solvent is maintained quiescent as it collects in the lower end of the charging tank 11 in order to insure efficient gravitational separation from the buoyant meal; the conduit 16 being adapted to withdraw the oil bearing solvent without appreciably disturbing this quiescent condition, and the conduits 26, 32 and 34 supplying aqueous moisture and solvent to the meal, prior to the oil bearing solvent collecting in the lower end of the charging tank, so that the moving flow via these conduits in no way disturbs the desired quiescent condition.

The aqueous moisture which is absorbed by the meal to provide the desired specific gravity differential, is later removed from the meal to conserve any solvent which is present and in order to eventually recover completely dry meal. Therefore in order to eliminate the necessity of subsequently evaporating excessively large quantities of moisture, only such limited quantity of aqueous moisture is initially supplied to the meal for absorption thereby, as will produce a specific gravity differential whereby the major portion of the meal, including all the larger particles, will separate from the oil bearing solvent which settles to the bottom of the charging tank 11, but without adding such excessive quantity of aqueous moisture as would be required to insure complete absorption thereof by the very fine particles of meal. Consequently the very fine particles of meal may not have absorbed such quantity of moisture during their treatment by the solvent in the charging tank 11, as to create a specific gravity differential whereby all of these fine particles will rise above the oil bearing solvent, and therefore some fine particles of meal may remain suspended in the oil bearing solvent and may be withdrawn therewith via the conduit 16. Before distilling the oil bearing solvent, these fine particles of meal are separated and removed.

For this purpose, additional aqueous moisture is added to the oil bearing solvent containing these fine particles of meal in suspension, to insure maximum absorption of moisture by these particles of meal for obtaining the greatest possible specific gravity differential between the particles of meal and the oil bearing solvent. This addition of aqueous moisture is preferably in such excess as will wash the fine particles of meal from the oil bearing solvent, and to insure a thorough washing action the oil bearing solvent containing fine particles of suspended meal is preferably agitated while the excess of aqueous moisture is being added thereto. The flow is then maintained quiescent, so that responsive to specific gravity differential the oil bearing solvent settles clear of the completely hydrated fine particles of meal.

As an instance of this arrangement, the conduit 16 which is provided with a suitable constant volume pump 36, leads to the upper end of a washer 40 which is preferably provided with an agitator 41, and water is supplied to the washer, in excess of the quantity which the fine particles of meal suspended in the solvent are capable of absorbing. The flow is drained from the washer via a conduit 42 and is supplied to the lower portion of a settling tank 43. Water is supplied to the upper portion of this settling tank, and the water which is supplied to the washer 40 may be furnished via a conduit 45 which leads from the upper portion of the settling tank and which may be connected to an injector 46, so that the oil bearing solvent which is pumped through the line 16 draws water into the washer along with the solvent.

In the settling tank 43, the flow is maintained quiescent so that the oil bearing solvent, free of meal, settles to the bottom of the tank and all the hydrated meal of appreciably lower specific gravity readily rises from and collects above the solvent. The meal thus collects in an intermediate zone, above the solvent but below the excess of water which is contained in the settling tank above the layer of meal and which is of still lower specific gravity. The incoming flow to the settling tank is supplied below the zone in which the intermediate layer of hydrated meal collects, so as not to disturb quiescent collection of said layer of meal, and the excess of water which is present in the flow rises from the solvent responsive to the lower specific gravity of the water, and tends to carry with it the fine particles of meal so as to aid the specific gravity separation of the hydrated meal from the oil bearing solvent. The water which rises through and collects above the layer of hydrated meal, is of but slightly lower specific gravity than the meal, and therefore rises through the meal so slowly as not to disturb the quiescent state.

The desired liquid level is automatically maintained in the settling tank 43, preferably by a float 53 which regulates the quantity of water which is supplied via a conduit 54 leading to the upper portion of the settling tank, and a pump 55 supplies water via this conduit, preferably from the water storage tank 25. The oil bearing solvent, free of meal, is withdrawn from the bottom of the settling tank 43, via the conduit 50, and this conduit extends upwardly and forms a discharge 52 at such level that with the desired liquid level maintained in the settling chamber by the float 53, the layers of solvent, meal and water are so proportioned in the settling tank that the layer of meal occupies the desired zone.

The oil bearing solvent, free of meal, preferably discharges via 52 into a sealing chamber 56, from whence the flow may be drawn into the still 17 via a conduit 57. The oil bearing solvent is drawn through the conduit 57 by the partial vacuum which is maintained in that part of the closed system which includes the upper end of conduit 40 12, dryer 13, still 17, condenser 21, separator 22 and storage tank 25; and a liquid seal, which may be controlled by a float 58, is maintained in the chamber 56 for sealing the settling tank 43 from the aforementioned partial vacuum which is maintained in the remaining elements of the closed system.

The layer of meal which separates from the solvent and collects at an intermediate zone in the settling tank 43, will include appreciable aqueous moisture in excess of that which has been absorbed by the meal, due to the relatively slight specific gravity differential between the hydrated meal and the excess aqueous moisture. The meal which collects thus forms a very thin semi-liquid intermediate layer in the settling tank; and this semi-liquid mass is withdrawn from the settling tank but is preferably retained in the closed system, for recovery of any solvent which is still present with the meal, and for final recovery of the meal, thoroughly dried.

For this purpose, the layer of thin semi-liquid meal is preferably returned to the charging tank 11 for solvent extraction of any oil which is still present in its meal content, and for reuse of its water content for furnishing moisture to the meal which is initially supplied to the system, and for subsequent withdrawal of said meal content into the dryer 13; for drying the meal and recovering the solvent and water vapors which are evaporated therefrom. As an instance of this arrangement the semi-liquid meal may furnish all of the water which is initially supplied to the system via the conduit 34, there being a conduit 60 leading from the settling tank 43 at the level at which the intermediate layer of semi-liquid meal forms, with a suitable pump 61 provided in said conduit, and with this conduit 60 connected to the conduit 34, preferably via a suitable flow regulating means.

This flow regulating means insures only the desired limited quantity of moisture being initially furnished to the meal which is supplied via the hopper 30, and is shown as a manually adjustable valve 71 in the conduit 34. To insure uniform pressure in the conduit 34, so that the flow may be accurately regulated by the valve 71, the conduit 60 may pump the semi-liquid flow into a storage chamber 62, with the conduit 34 leading from this storage chamber and with an overflow conduit 63 leading from the storage chamber back to the conduit 60 at the intake side of its pump 61. The overflow being thus returned to the conduit 60 rather than to the settling tank 43, avoids turbulence in the settling tank such as would destroy the desired quiescent condition therein.

Pressure is equalized in the washer 40, settling tank 43, upright conduit 50, float chamber 56 and storage chamber 62, so that the solvent may drain by gravity from the settling tank 43 into the float chamber 56, and so that the thin semi-liquid meal may flow via conduit 34 to the conduit 32, and so that the injector 46 may draw water into the washer 40 via the conduit 45. For this purpose a series of conduits 51 may connect the upper ends of the elements 40, 43, 50, 56 and 62.

In practice, the moisture which is absorbed by the meal to increase the specific gravity differential, preferably has an unbalanced hydrogen ion concentration whereby it may be more readily absorbed by the meal, and for this purpose the water which is supplied via the conduit 34 may be a salt solution, the salt being added in any suitable manner (not shown).

By manually adjusting the regulating valve 71, water is preferably supplied via the conduit 34 in such quantity as to raise the moisture content of the incoming meal which is supplied via the hopper 30, approximately 20% to 30% by weight of cognate meal from which all oil has been extracted and which has been thoroughly dried, i. e., the meal which is finally discharged via the gate 29. Absorption of moisture by the incoming meal may thus be accurately controlled, for absorption of aqueous moisture by the meal for lowering its specific gravity so that the large particles of meal will readily separate from the oil bearing solvent, but without absorption of such quantity of moisture by the incoming meal as would reduce it to a state where it would be difficult to handle. On the other hand, the small quantity of fine particles of meal which remain suspended in the oil bearing solvent which settles and which is drained off via the conduit 16, is subsequently washed with excess aqueous moisture for maximum absorption of moisture by these fine particles, so as to insure maximum specific gravity differential for separating these fine particles of meal from the oil bearing solvent.

It will thus be seen that only the fine particles of meal are subjected to maximum absorption of moisture, with any excess of moisture which is present with these fine particles of meal then utilized for limited absorption of moisture by the main body of meal which is supplied via the hopper 30. Consequently only such quantity of moisture is used in the system as is required to produce partial reduction in the specific gravity of the main body of meal comprising the larger particles, and maximum reduction in the specific gravity of only that portion of the meal which remains suspended in the oil bearing solvent, and which comprises only the relatively small quantity of extremely fine particles of meal. By thus limiting the quantity of aqueous moisture which is used, the meal may be subsequently dried of its entire moisture content, without requiring evaporation of a relatively large quantity of moisture.

The invention as thus described, provides practical and efficient means for separating material from a liquid in which it is treated, by causing the material to absorb an impregnating liquid which is immiscible in the first liquid and which changes the specific gravity of the material so that it is appreciably different from that of the first liquid, and whereby the impregnated material and the liquid in which it is being treated may be readily separated by specific gravity differential.

As applied to solvent extraction of oil from meal, the invention thus provides for absorption of aqueous mixture by the meal so as to reduce its specific gravity appreciably below that of a relatively heavy solvent such as trichlorethylene, but without initial absorption of such quantity of moisture as would make it difficult to handle the meal. The oil bearing solvent which settles below the meal may thus be drained off, with the meal which has passed through the solvent rising therefrom as a result of its buoyancy, and then being removed from the solvent and dried and separately recovered. The oil bearing solvent which settles from the meal and which may still contain some fine particles of meal in suspension, is then washed in an excess of aqueous moisture to insure maximum absorption by the meal, resulting in maximum specific gravity differential between the fine particles of meal and the oil bearing solvent. The flow is then allowed to settle, whereby the oil bearing solvent may be drained off, clear of meal. The fine particles of meal with such excess of aqueous moisture as to form a thin semi-liquid, are returned to the main body of meal which is to be treated, in order to supply the moisture which is to be absorbed by the incoming meal. These fine particles of meal and the excess aqueous moisture, are thus retained in the system for recovery of all solvent absorbed thereby, and for thoroughly drying the meal before it is finally discharged at the outlet end of the closed system.

I claim:

1. In solvent extraction of oil from oleaginous material, the steps including: adding to the material a solvent for the oil and a liquid which is absorbable by the material and which is immiscible with and of different specific gravity than the solvent, gravitationally separating the oil-bearing solvent from the liquid impregnated material, whereby fine particles of the material may remain suspended in the gravitationally separated oil-bearing solvent, the liquid being added to the material without disturbing quiescence of the gravitationally separating oil-bearing solvent, adding to the gravitationally separated oil-bearing solvent a liquid cognate to the first mentioned liquid for absorption of said last mentioned liquid by remaining suspended material, and gravitationally separating the oil-bearing solvent from this last mentioned liquid-impregnated material.

2. In solvent extraction of oil from oleaginous material, the steps including: adding to the material a solvent for the oil and a liquid which is absorbable by the material and which is immiscible with and of different specific gravity than the solvent, the liquid being added to the material in quantity less than that capable of being absorbed by the material, gravitationally separating the oil-bearing solvent from the liquid-impregnated material, whereby fine particles of the material may remain suspended in the gravitationally separated oil-bearing solvent, adding to the gravitationally separated oil-bearing solvent a liquid cognate to the first mentioned liquid for absorption of said last mentioned liquid by remaining suspended material, the last mentioned liquid being supplied in excess of that capable of being absorbed by remaining suspended material, and gravitationally separating the oil-bearing solvent from the last mentioned liquid-impregnated material and from excess last mentioned liquid.

3. In solvent extraction of oil from oleoginous material, the steps including: adding to the material a solvent for the oil and a liquid which is absorbable by the material and which is immiscible with and of different specific gravity than the solvent, gravitationally separating the oil-bearing solvent from the liquid-impregnated material, whereby fine particles of the material may remain suspended in the gravitationally separated oil-bearing solvent, adding to the gravitationally separated oil-bearing solvent a liquid cognate to the first mentioned liquid for absorption of said last mentioned liquid by remaining suspended material, gravitationally separating the oil-bearing solvent from this last mentioned liquid-impregnated material, and while retaining said last mentioned liquid-impregnated material in a closed system returning the same to material to which solvent and liquid are to be added during the first mentioned step of the process.

4. In solvent extraction of oil from oleaginous material, the steps including: adding to the material a solvent for the oil, gravitationally separating the oil-bearing solvent from the material, whereby fine particles of the material may remain suspended in the gravitationally separated oil-bearing solvent, adding to the gravitationally separated oil-bearing solvent a liquid which is absorbable by remaining suspended material and which is immiscible with and of different specific gravity than the oil-bearing solvent, gravitationally separating the oil-bearing solvent and the liquid-impregnated material, and returning the liquid-impregnated material to that material to which solvent is to be added during the first mentioned step of the process.

5. In solvent extraction of oil from oleaginous material, the steps including: adding to the material a solvent for the oil and a liquid which is absorbable by the material and which is immiscible with and of different specific gravity than the solvent, gravitationally separating the oil-bearing solvent from the liquid-impregnated material, whereby fine particles of the material may remain suspended in the gravitationally separated oil-bearing solvent, adding to the gravitationally separated oil-bearing solvent a liquid cognate to the first mentioned liquid for absorption of said last mentioned liquid by remaining suspended material, gravitationally separating the oil-bearing solvent from this last mentioned liquid-impregnated material and from excess last mentioned liquid, and while retaining said last mentioned liquid-impregnated material and said excess liquid in a closed system returning liquid-impregnated material and excess liquid to material to which solvent and liquid are to be added during the first mentioned step of the process.

6. In solvent extraction of oil from oleaginous material, the steps including: adding to the material a solvent for the oil and a liquid which is absorbable by the material and which is immiscible with and of different specific gravity than the solvent, gravitationally separating the oil-bearing solvent from the liquid-impregnated material, whereby fine particles of the material may remain suspended in the gravitationally separated oil-bearing solvent, adding to the gravitationally separated oil-bearing solvent a liquid cognate to the first mentioned liquid for absorption of said last mentioned liquid by remaining suspended material, gravitationally separating the oil-bearing solvent from this last mentioned liquid-impregnated material and from excess last mentioned liquid, and while retaining said excess liquid in a closed system returning the same to material to which solvent and liquid are to be added during the first mentioned step of the process.

7. In solvent extraction of oil from oleaginous material, the steps including: adding to the material a solvent for the oil and a liquid which is absorbable by the material and which is immiscible with and of different specific gravity than the solvent, gravitationally separating the oil-bearing solvent from the liquid-impregnated material, whereby fine particles of the material may remain suspended in the gravitationally separated oil-bearing solvent, adding to the gravitationally separated oil-bearing solvent a liquid cognate to the first mentioned liquid for absorption of said last mentioned liquid by remaining suspended material, the last mentioned liquid being supplied in excess of that which will be absorbed by remaining suspended material, gravitationally separating the oil-bearing solvent from the last mentioned liquid-impregnated material and from excess last mentioned liquid, returning said excess liquid to material to which solvent and liquid are added during the first mentioned step of the process, and regulating said return of excess liquid to that which will provide less than complete saturation of all of said last mentioned material.

8. In solvent extraction of oil from oleaginous material, the steps including: adding to the material a solvent for the oil, gravitationally separating the material and the oil-bearing solvent in a quiescent zone, withdrawing oil-bearing solvent from the quiescent zone, adding to the withdrawn oil-bearing solvent a liquid which is absorbable by any of said material which remains in the oil-bearing solvent, the liquid being immiscible with and of different specific gravity than the oil-bearing solvent, and gravitationally separating the oil-bearing solvent and the liquid-impregnated material.

9. In solvent extraction of oil from oleaginous material, the steps including: adding to the material a solvent for the oil, separating the oil-bearing solvent and the material, withdrawing oil-bearing solvent from the separation zone, adding to the withdrawn oil-bearing solvent a liquid which is absorbable by any of said material which remains in the oil-bearing solvent, the liquid being immiscible with and of different specific gravity than the oil-bearing solvent, gravitationally separating the oil-bearing solvent and the liquid-impregnated material and excess liquid, and withdrawing said excess liquid from the zone of said last mentioned separation and returning the same for use as the liquid which is added to the oil-bearing solvent.

10. In solvent extraction of oil from oleaginous material, the steps including: adding to the material a solvent for the oil and a liquid which is absorbable by the material and which is immiscible with and of different specific gravity than the solvent, the liquid being added to the material in quantity less than that capable of being absorbed by the material, gravitationally separating the oil-bearing solvent and the liquid impregnated material, adding to the separated oil-bearing solvent a liquid cognate to the first mentioned liquid for absorption of said last mentioned liquid by any of the said material which remains in the oil-bearing solvent, and gravitationally separating the oil-bearing solvent and the last mentioned liquid-impregnated material.

11. In solvent extraction of oil from oleaginous material, the steps including: adding to the material a solvent for the oil, gravitationally separating the material and the oil-bearing solvent, withdrawing the oil-bearing solvent from the separation zone, adding to the withdrawn oil-bearing solvent a liquid absorbable but in excess of that capable of being absorbed by any of said material which remains with the oil-bearing solvent, the liquid being immiscible with and of different specific gravity than the oil-bearing solvent, and gravitationally separating the oil-bearing solvent and the liquid-impregnated material and excess liquid.

12. In solvent extraction of oil from oleaginous material, the steps including: adding to the material a solvent for the oil, gravitationally separating the material and the oil-bearing solvent, withdrawing oil-bearing solvent from the separation zone, adding to the withdrawn oil-bearing solvent a liquid which is absorbable by any of said material which remains with the oil-bearing solvent, the liquid being immiscible with and of different specific gravity than the oil-bearing solvent, gravitationally separating the oil-bearing solvent and the liquid-impregnated material and excess liquid, and withdrawing said liquid-impregnated material and excess liquid from said last mentioned separation zone and returning liquid-impregnated material and excess liquid to the solvent-extraction step of the process.

13. In solvent extraction of oil from oleaginous material, the steps including: adding to the material a solvent for the oil, gravitationally separating the material and the oil-bearing solvent, withdrawing oil-bearing solvent from the separation zone, adding to the withdrawn oil-bearing solvent a liquid which is absorbable by any of said material which remains with the oil-bearing solvent, the liquid being immiscible with and of different specific gravity than the oil-bearing solvent, gravitationally separating the oil-bearing solvent from the liquid-impregnated material and from excess liquid, and returning excess liquid to the solvent-extraction step of the process.

14. In solvent extraction of oil from oleaginous material, the steps including: adding to the material a solvent for the oil, gravitationally separating the material and the oil-bearing solvent, withdrawing oil-bearing solvent from the separation zone, adding to the withdrawn oil-bearing solvent a liquid which is absorbable by any of said material which remains with the oil-bearing solvent, the liquid being immiscible with and of different specific gravity than the oil-bearing solvent, gravitationally separating the oil-bearing solvent and the liquid-impregnated material and excess liquid, withdrawing said liquid-impregnated material and a portion of said excess liquid from said last mentioned separation zone and returning liquid-impregnated material and said portion of the excess liquid to the solvent-extraction step of the process, and withdrawing another portion of said excess liquid from said last mentioned separation zone and returning the same for use as the liquid which is added to the oil-bearing solvent.

15. In solvent extraction of oil from oleaginous material, the steps including: adding to the material a solvent for the oil, gravitationally separating the material and the oil-bearing solvent, withdrawing the oil-bearing solvent from the separation zone, adding water to the withdrawn oil-bearing solvent in excess of that capable of being absorbed by any of the material which remains with the oil-bearing solvent, gravitationally separating oil-bearing solvent and water-impregnated material and excess water, withdrawing said water-impregnated material and excess water from said last mentioned separation zone and returning water-impregnated material and excess water to material which is to be processed, and regulating said return so as to increase the water content of material which is to be processed approximately 20% to 30% of its oil-free and water-free dry weight.

DAN McDONALD.